United States Patent Office 3,024,241
Patented Mar. 6, 1962

3,024,241
N-ETHER-ALKYLENE NORPETHIDINES
Peter Marshall Frearson, Accrington, England, and Edward Severin Stern, Edinburgh, Scotland, assignors to J. F. MacFarlan & Company Limited, Hertfordshire, England, a British company
No Drawing. Filed Feb. 25, 1959, Ser. No. 795,314
Claims priority, application Great Britain Nov. 28, 1955
6 Claims. (Cl. 260—294.3)

This invention relates to novel piperidine compounds and their production. This application is a continuation in part of application Serial No. 621,998, filed November 14, 1956, now abandoned.

The piperidine compounds of the invention are norpethidine derivatives of the general formula:

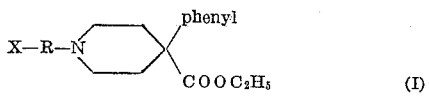

where X is selected from the group consisting of tetrahydrofurfuryloxy, tetrahydropyranylmethoxy, ethoxyethoxy and phenoxyethoxy and R is alkylene of 1 to 6 carbon atoms. X, for example, denotes the ethoxy-ethoxy, α-tetrahydropyranylmethoxy, phenoxyethoxy or tetrahydrofurfuryloxy group.

Of the compounds of the general Formula I we prefer 1 - (2' - tetrahydrofurfuryloxyethyl) norpethidine; 1-(2'-α-tetrahydropyranylmethoxylethyl)norpethidine; 1-(4'-tetrahydrofurfuryloxybutyl)norpethidine; 1 - (2' - 2''-ethoxyethoxyethyl)norpethidine and 1-(2'-2''-phenoxyethoxyethyl)norpethidine.

The norpethidine derivatives of the present invention are physiologically active as spasmolytics, analgesics, and/or cough-suppressants.

The analgesic potency of some of the compounds of the present invention, as compared with pethidine (potency 0.4) is shown in the following table:

| Compound | Potency | Examples in which substance is described |
|---|---|---|
| 1 - (3' - tetrahydrofurfuryloxypropyl) norpethidine. | 0.5 | IV. |
| 1-(2'-2''-phenoxyethoxyethyl)norpethidine hydrobromide. | 0.4 | V. |
| 1-(4'-tetrahydrofurfuryloxybutyl)norpethidine. | 1.3 | VI. |
| 1-(2'-2''-tetrahydrofurfuryloxyethoxyethyl)-norpethidine. | 0.4 | VII. |

The norpethidine derivatives of the above general formula can be prepared by heating in the liquid phase norpethidine with a compound of the general formula X—R-Hal, where X and R have the above-defined meanings, and Hal is chlorine, bromine or iodine.

Alternatively compounds of the above general formula can be prepared by heating in the liquid phase a 1-(halogenoalkyl)norpethidine of the general formula:

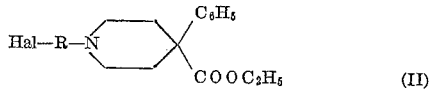

where R and Hal have the above defined meanings with a compound of the general formula X—Na, where X has the above-defined meaning. The above-mentioned 1-(halogenoalkyl)norpethidine can be prepared by reacting norpethidine with a compound of the general formula HO—R-Hal, where R and Hal have the above-defined meanings and conversion of the resulting 1-(hydroxyalkyl)norpethidine into the corresponding 1-halogenoalkyl compound.

Alternatively the compounds of the above general Formula I can be prepared by heating in the liquid phase a di(chloroethyl) amine substituted by the group X—R, where X and R have the meanings given above with benzyl cyanide to form the corresponding 4-benzyl-4-cyanopiperidine which is then subjected to acid hydrolysis to convert the cyano group into a carboxyl group and esterifying the acid so obtained by heating under acid conditions with excess of an anhydrous alcohol, e.g. ethyl alcohol, with removal of the water formed.

The following examples, in which parts are parts by weight, illustrate the production of the derivatives of the invention.

EXAMPLE I

*1-(2'-2''-Ethoxyethoxyethyl)Norpethidine i.e.
1-(3':5'-Dioxaoctyl)Norpethidine*

A mixture of norpethidine (5 parts), 3:5-dioxaoctyl chloride (2-2'-ethoxyethoxyethyl chloride) (3.3 parts), and sodium carbonate (2 parts) was refluxed for 24 hours in alcohol (40 parts). Filtration and fractional distillation of the filtrate then gave the desired 1-(3':5'-dioxaoctyl) norpethidine, B.P. 175-185° C./1 mm., $n_D^{20}$ 1.5122.

EXAMPLE II

*1-(2'-Tetrahydrofurfuryloxyethyl)Norpethidine*

A mixture of 2-chloroethyl tetrahydrofurfuryl ether [α - 2 - chloroethoxymethyltetrahydrofuran] (35 parts), B.P. 95–96° C./16 mm., $n_D^{20}$ 1.4628, and norpethidine (50 parts) was refluxed in alcohol (400 parts) over sodium carbonate (20 parts) for 24 hours. The suspension was then filtered and the filtrate concentrated. The residue on fractional distillation gave 1-2'-tetrahydrofurfuryloxyethylnorpethidine, B.P. 210° C./0.5 mm.

EXAMPLE III

*1-(2'-α-Tetrahydropyranylmethoxy)Ethylnorpethidine*

A mixture of 2-chloroethyl α-tetrahydropyranylmethyl ether (2 parts), B.P. 125° C./25 mm., $n_D^{20}$ 1.4634, and norpethidine (2.5 parts) was refluxed in alcohol (40 parts) over sodium carbonate (2 parts) for 24 hours. The suspension was then filtered and the filtrate concentrated. The residue on fractional distillation gave 1-(2'-α-tetrahydropyranylmethoxy)ethylnorpethidine, B.P. 198° C./0.5 mm.

EXAMPLE IV

*1-(3'-Tetrahydrofurfuryloxypropyl)Norpethidine*

Alkylation of norpethidine (25 parts) with 3-tetrahydrofurfuryloxypropyl chloride (25 parts), B.P. 120° C./16 mm., in boiling amyl alcohol over sodium carbonate (5 parts) gave, after filtration and vacuum distillation 1 - (3' - tetrahydrofurfuryloxypropyl)norpethidine, B.P. 225° C./0.5 mm., $n_D^{20}$ 1.5110.

EXAMPLE V

*1-(2'-2''-Phenoxyethoxyethyl)Norpethidine Hydrobromide*

A mixture of 2-2'-phenoxyethoxyethyl chloride (50 parts) and norpethidine (25 parts) was kept in boiling amyl alcohol (200 parts) over sodium carbonate (5 parts) for 48 hours. The product was filtered and the filtrate concentrated in vacuo and then treated with 40% aqueous hydrobromic acid. 1-(2'-2''-phenoxyethoxyethyl)norpethidine hydrobromide (27 parts) crystallised out and on recrystallisation from ethanol had M.P. 172–173° C.

EXAMPLE VI

*1-(4'-Tetrahydrofurfuryloxybutyl)Norpethidine*

4-tetrahydrofurfuryloxybutyl chloride (50 parts), B.P. 120° C./20 mm., $n_D^{20}$ 1.4617, and norpethidine (35 parts) were kept over sodium carbonate (10 parts) in boiling pentanol for 48 hours. The product was filtered and the filtrate distilled. 1-(4'-tetrahydrofurfuryloxybutyl)norpethidine was obtained with B.P. 196° C./1.5 mm., $n_D^{20}$ 1.5140. On prolonged keeping it solidified and had M.P. ca. 30° C.

EXAMPLE VII

*1-(2'-2"-Tetrahydrofurfuryloxyethoxyethyl)Norpethidine*

2 - 2' - tetrahydrofurfuryloxyethoxyethyl chloride (50 parts), B.P. 130° C./5 mm., $n_D^{20}$ 1.4630, and norpethidine (40 parts) were heated over sodium carbonate (10 parts) in pentanol at 140° C. for 40 hours. The product was filtered and the filtrate distilled. 1-(2'-2"-tetrahydrofurfuryloxyethoxyethyl)norpethidine was obtained of B.P. 195° C./1 mm.

What we claim is:

1. Norpethidine derivatives of the formula:

where X is selected from the group consisting of tetrahydrofurfuryloxy, tetrahydropyranylmethoxy, ethoxyethoxy and phenoxyethoxy and R is alkylene of 1 to 6 carbon atoms.

2. 1-(2'-tetrahydrofurfuryloxyethyl)norpethidine.
3. 1 - (2'-α-tetrahydropyranylmethoxyethyl)norpethidine.
4. 1-(4'-tetrahydrofurfuryloxybutyl)norpethidine.
5. 1-(2'-2"-ethoxyethoxyethyl)norpethidine.
6. 1-(2'-2"-phenoxyethoxyethyl)norpethidine.

References Cited in the file of this patent

UNITED STATES PATENTS

| | | |
|---|---|---|
| 1,886,481 | Hartman et al. | Nov. 8, 1932 |
| 2,400,913 | Burger | May 28, 1946 |
| 2,784,192 | Schmidle et al. | Mar. 5, 1957 |
| 2,846,437 | Elpern | Aug. 5, 1958 |